United States Patent [19]
Haldimann

[11] 4,197,047
[45] Apr. 8, 1980

[54] SHELF STORAGE SYSTEM

[75] Inventor: Hans R. Haldimann, Zurich, Switzerland

[73] Assignee: Weelpal AG, Zug, Switzerland

[21] Appl. No.: 909,492

[22] Filed: May 25, 1978

Related U.S. Application Data

[63] Continuation-in-part of Ser. No. 743,938, Nov. 22, 1976, abandoned.

[30] Foreign Application Priority Data

Nov. 28, 1975 [CH] Switzerland ................. 15519/75

[51] Int. Cl.² .............................................. B65G 1/08
[52] U.S. Cl. ...................................... 414/276; 414/278
[58] Field of Search ............... 280/79.1; 414/276, 267, 414/269, 277, 278

[56] References Cited
U.S. PATENT DOCUMENTS

| | | | |
|---|---|---|---|
| 1,704,342 | 3/1929 | Redpath et al. | 214/16.1 CE |
| 2,095,151 | 10/1937 | O'Connor et al. | 214/16.4 C |
| 3,547,282 | 12/1970 | Hartbauer et al. | 214/16.4 A |
| 3,674,158 | 7/1972 | Owen | 214/16.1 CE |
| 3,674,159 | 7/1972 | Lemelson | 214/16.4 A |
| 3,921,828 | 11/1975 | Suizu | 214/16.4 C |
| 3,927,773 | 12/1975 | Bright | 214/16.4 C |
| 3,942,814 | 3/1976 | Buhler | 280/79.1 |
| 3,982,639 | 9/1976 | Haldimann et al. | 214/16.4 C |

*Primary Examiner*—L. J. Paperner
*Assistant Examiner*—Terrance L. Siemens
*Attorney, Agent, or Firm*—Abraham A. Saffitz

[57] ABSTRACT

An unloading mechanism for a shelf storage system in which a load of goods is supported on a pallet which constitutes a unit load, the load and pallet resting on a mobile storage and transport unit which unit is subjected to the action of the unloading mechanism for removal from the storage pile. The unloading mechanism comprises a modified section of a trackway at the very end at a vertical stop where the unit load, with its four wheeled unit, is lifted by a lifting conveyer to elevate the front wheels of the four wheeled unit first over the stop and then over a cam which is hump shaped and facilitates the pulling of the wheeled unit to clear the front wheels. The lifting is done at the front by the lifting conveyer and done by the wheels engaging the hump shaped cams at the back. The load is then removed. A follow-up unit load of goods on a pallet and four wheeled transport unit moves down the inclined trackway to replace the unit load just removed.

1 Claim, 8 Drawing Figures

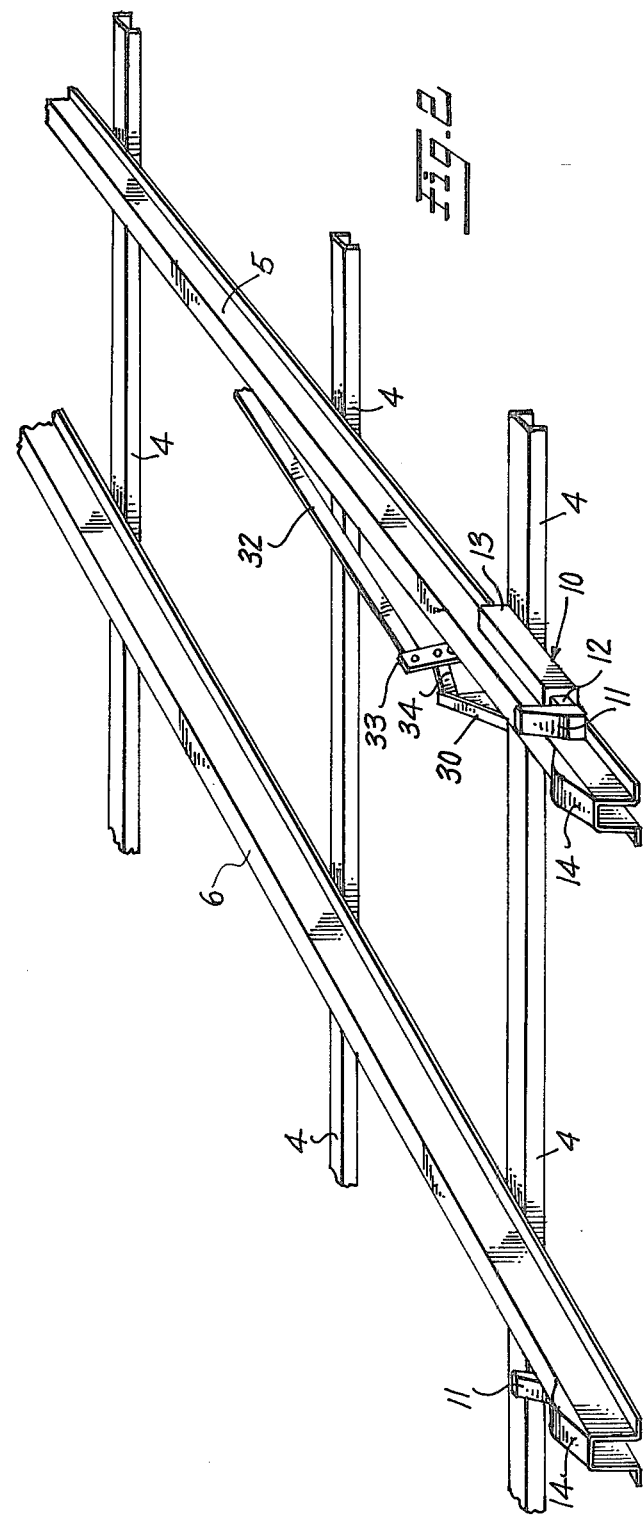

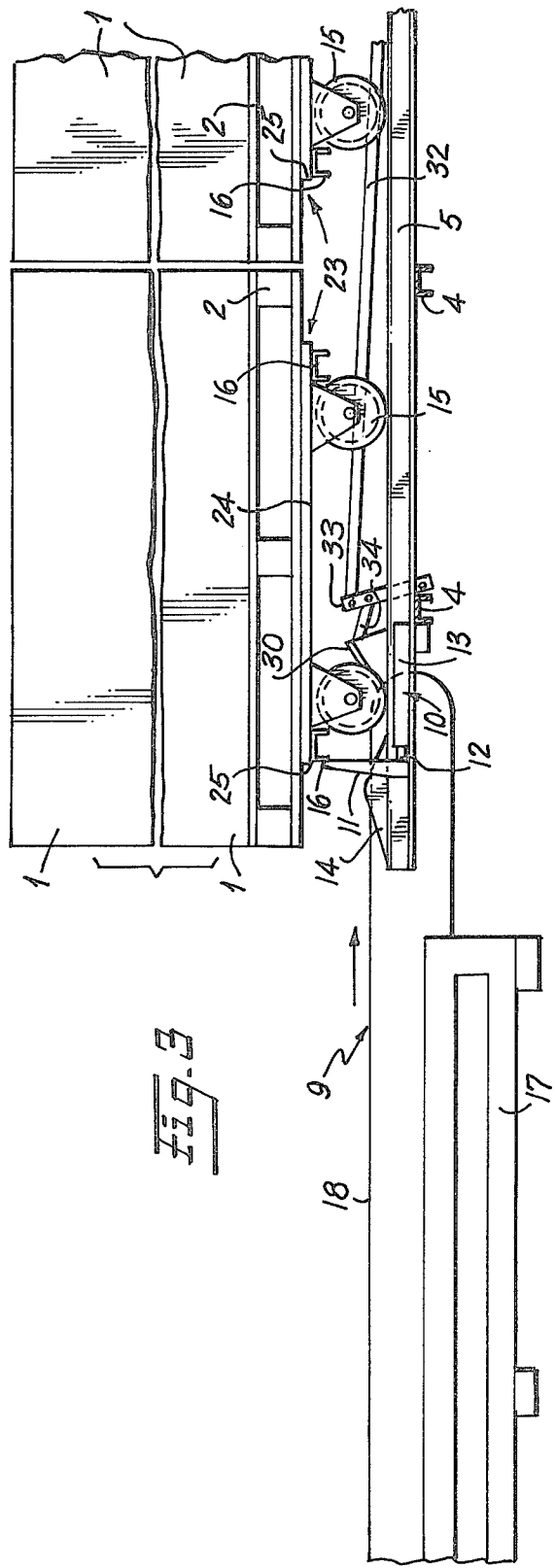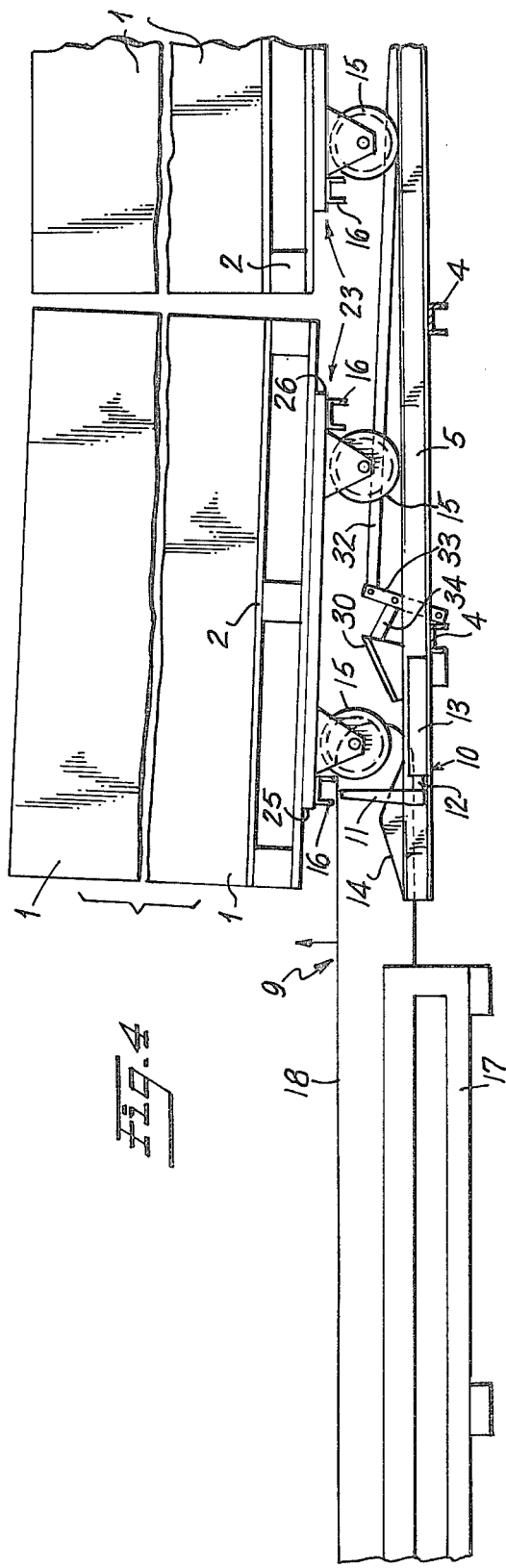

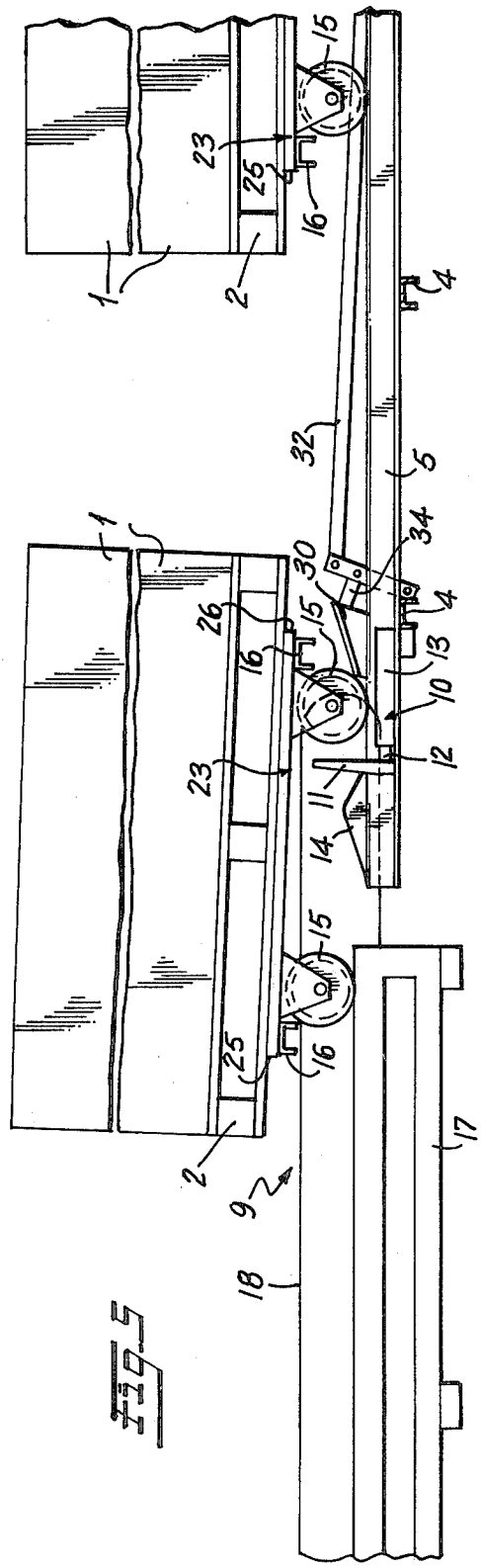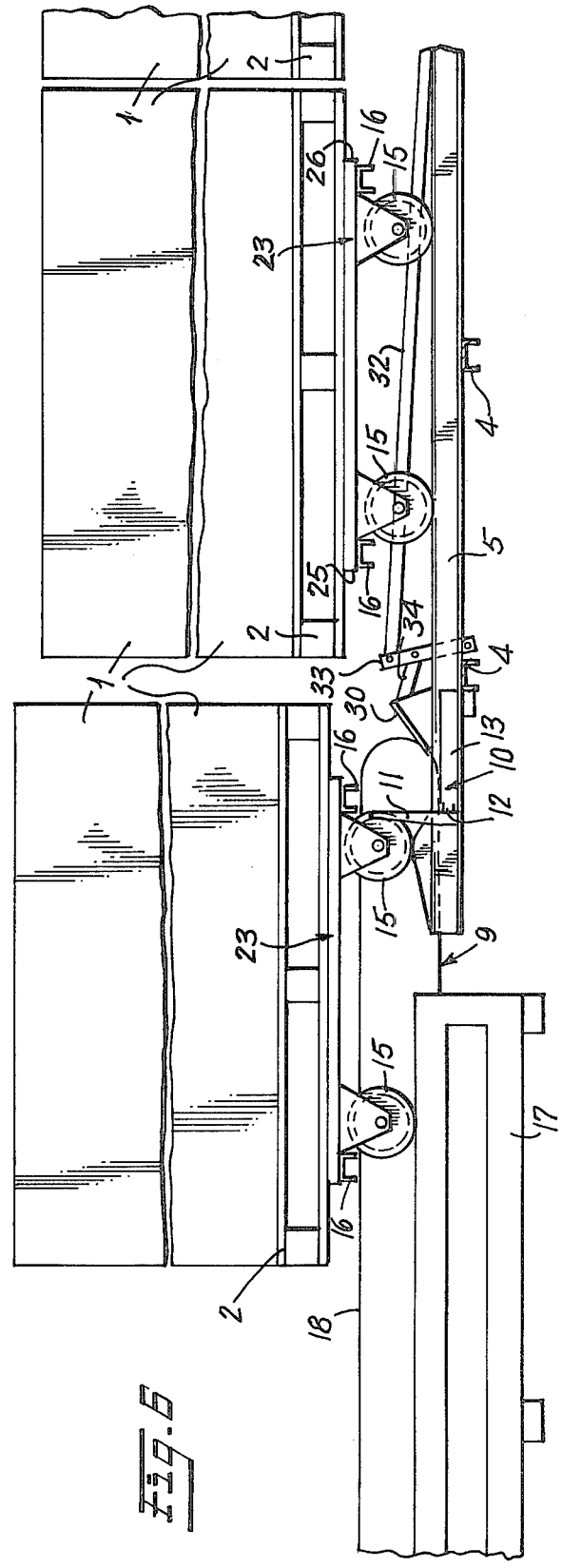

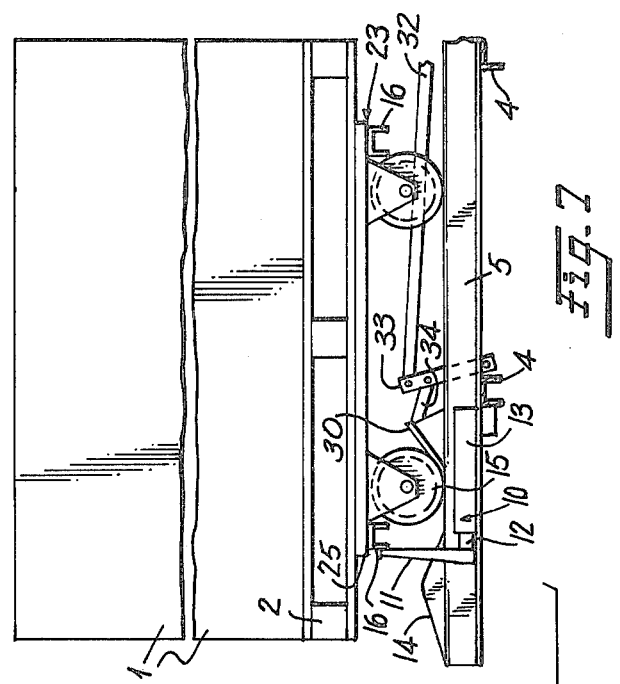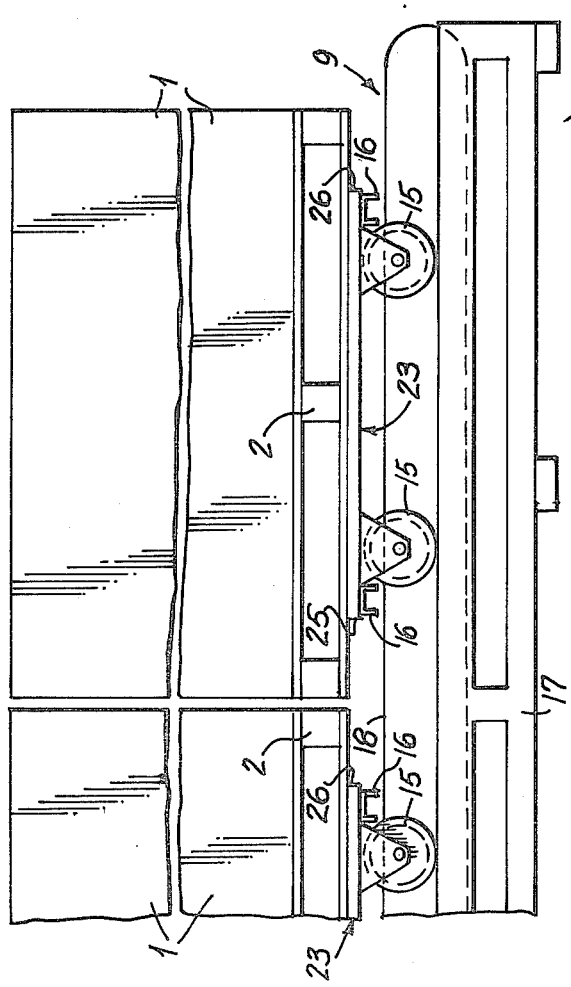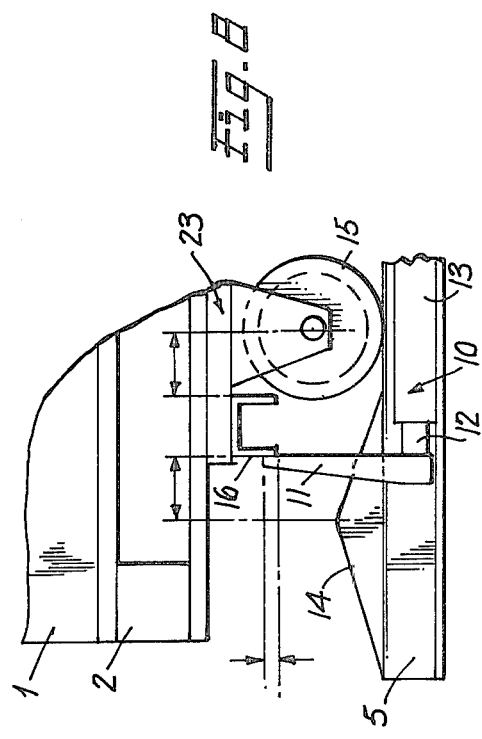

SHELF STORAGE SYSTEM

CROSS REFERENCE TO RELATED APPLICATIONS

This application is a continuation-in-part of my prior United States Patent Application, Ser. No. 743,938 filed Nov. 22, 1976, now abandoned which is based for priority under 35 USC 119 on Swiss Patent Application 15,519/75 filed Nov. 28, 1975.

BACKGROUND OF THE INVENTION

1. Field of the Invention

The present invention relates to an unloading mechanism for a palletized unit in a shelf storage system. In the present shelf storage system the goods to be stored are placed on unit pallets and supported on mobile storage and transport units in shelves. Each unit pallet on each transport unit moves on rails. Conveying mechanisms are provided for transport of the goods within the storage system to remove a unit load on a transport unit. Auxiliary mechanisms for loading and unloading of the shelves and also for driving, braking and holding position are used in the system and means are contemplated for counting and changing position of the storage and transport units.

2. Description of the Prior Art

The shelf storage system which is improved by the unloading mechanism of the present invention employs mobile four wheeled units for storage as disclosed in Buhler, U.S. Pat. No. 3,942,814, granted Mar. 7, 1976 and the shelf arrangement for unit load storage and conveyer movement is disclosed in Haldimann et al, U.S. Pat. No. 3,982,639, granted Sept. 28, 1976.

In order to remove storage units from a shelf, fork lift trucks have been used in the past as conveying vehicles which are manually driven through the lanes between the shelves. The lifting fork is applied to the desired shelf from which a unit is to be removed and a take-over apparatus mounted on the fork lift adapts the truck to remove the unit.

New improvements in the lateral displaceability of the take-over apparatus have made it possible to remove pallets from shelves without the fork lift truck having to be swung-in transversely to a shelf row. This improvement allows a very narrow design of the rows or shelves to a width of a few centimeters beyond that of the conveying vehicle. It is this narrow operating width to which the unloading mechanism of the present invention is adapted.

The individual shelf compartments within the shelf storage system are provided with rails which are inclined and it is on these rails that the storage units run. In the storage system there is provided, at the end of the shelf compartments, stop devices which prevent undesired movement at the ends of the rails thus assuring that there will be no failing of the storage units out of the shelf compartments. The conventional stops which have been used heretofore are formed in a hook-like shape but this causes a jumping up of the rolling transport unit with its loaded pallet brought about by the momentum and impact against the stop which frequently results in over jumping of the stop by the load on its pallet. It can easily be seen that the hook-like stops make removal of the rolling pallet from the shelf compartment much more difficult than if another stop could be used, especially since the hook-like stop must be swung out of the way of the storage unit. Thus, with the hook-like stop it is necessary to provide unlocking means which release the rolling pallets from the stops and raise the pallets above the stops.

It has already been proposed to use unlocking means for the rollers of the transport unit riding on the rails of the shelf in the location adjacent to the stops. This prior art unlocking means is arranged in a set of planes which are parallel to the planes of the rails so as to be freely rotatable on a common shaft and vertically adjustable. The two shaft ends of the common shaft are received in lateral slotted guides which make possible a parallel displacement of the shaft with simultaneous raising of the rollers. Using this solution for the problem of unlocking the roller unit one cannot manage without recourse to hydraulically actuatable plungers which must be mounted on the conveying vehicle and which have the essential track to provide for the parallel displacement of the shaft in the slotted guides with the conveying vehicle being in the coupled condition to the unlocking means.

An improved unlocking device of the parallel plane displacement type has been proposed which is simpler in design and comprises unlocking means which release the rolling storage units from the stops and which raise the same over the safety hooks to a take-out device. These unlocking means are provided with rollers which are mounted on that end of the take-out device near the shelf. The take-out device is generally of the lifting conveyer class and is turned towards the shelf opening. The rollers of the transport unit are mounted so as to be freely rotatable on a shaft which is perpendicular to the direction or displacement of the take-out apparatus. The ends of the perpendicularly oriented shaft project beyond the rollers and are used as guide bolts which cooperate with guideways situated in the region of the shelf opening. These guideways facilitate withdrawing of the unit load.

Although this improved system has given good results, it is expensive to build and has the disadvantage of a large number of moving parts which need constant maintenance and adjustment to prevent unwanted failure of operation.

OBJECTS OF THE INVENTION

An object of the present invention is to provide an improved unlocking apparatus cooperating with the stop means in a shelf storage system of the aforementioned type which meets the needs of close shelf spacing and which no longer involves the disadvantages indicated above of high equipment cost, high maintenance, frequent adjustments, so as to enable the mobile storage units to be removed from the shelves without providing any additional moving parts either on the shelf or on the take-over apparatus.

A further object of the invention is to provide for an improved unloading system using simple lifting conveying means and a hump shaped cam to facilitate a substantially level removal of the four wheeled transport unit, two wheels at a time.

SUMMARY OF THE INVENTION

According to the present invention there is provided a simplified unloading mechanism for the unloading of four wheeled transport units bearing goods on a pallet to effect the movement of the transport unit over the usual stop at the end of the shelf storage system from which the unloading takes place. In the simplified apparatus of the invention there is provided a rectangular stand formed of vertical members connected to each other by horizontally extending transverse members with a pair of longitudinal trackway members resting on the ends of the transverse members of said stand. The one end of the stand having the trackway members is at a higher elevation than the other end of said stand to thereby form a falling gradient at the receiving end of the stand where the transport unit comes to a stop.

A stop mechanism is provided at the lower end of said trackway members to adapt the storage of the mobile transport units, each loaded with goods on the trackway.

The mechanism for loading and unloading the transport unit on and off the shelf employs conveyer lifting means to bring the transport unit on a generally level path over the stop.

Auxiliary chock means are provided cooperating with the front wheels of the four wheeled mobile transport and storage units.

The end region of each of said trackways is provided with a hump shaped cam to aid in bringing the front two wheels and then the rear two wheels of the unit over the stop in a level manner.

The height of the hump elevation of the cams, one on each track, is more than the effective height of the stop. The distance of the tops of the cams from the stops is just a little less than the distance between the axis of rotation of the roller and the transverse member to facilitate clearance of the mobile unit over the stops.

BRIEF DESCRIPTION OF THE DRAWINGS

In order that the invention may be more fully understood an embodiment of the invention will now be described, by way of example, with reference to the accompanying drawings, in which:

FIG. 2 is a perspective view of part of a rail trackway as disposed in one of the shelves, FIGS. 3 to 7 show schematical side views of the take-out end of the shelf and of the take-over apparatus, explaining different phases of the removal of a loaded storage unit, and FIG. 8 is a diagram showing the relationship between the apex of the cam and the stop contact surface and the inward face of the transverse member and the axis of a wheel.

DESCRIPTION OF THE PREFERRED EMBODIMENT

Figure 1:
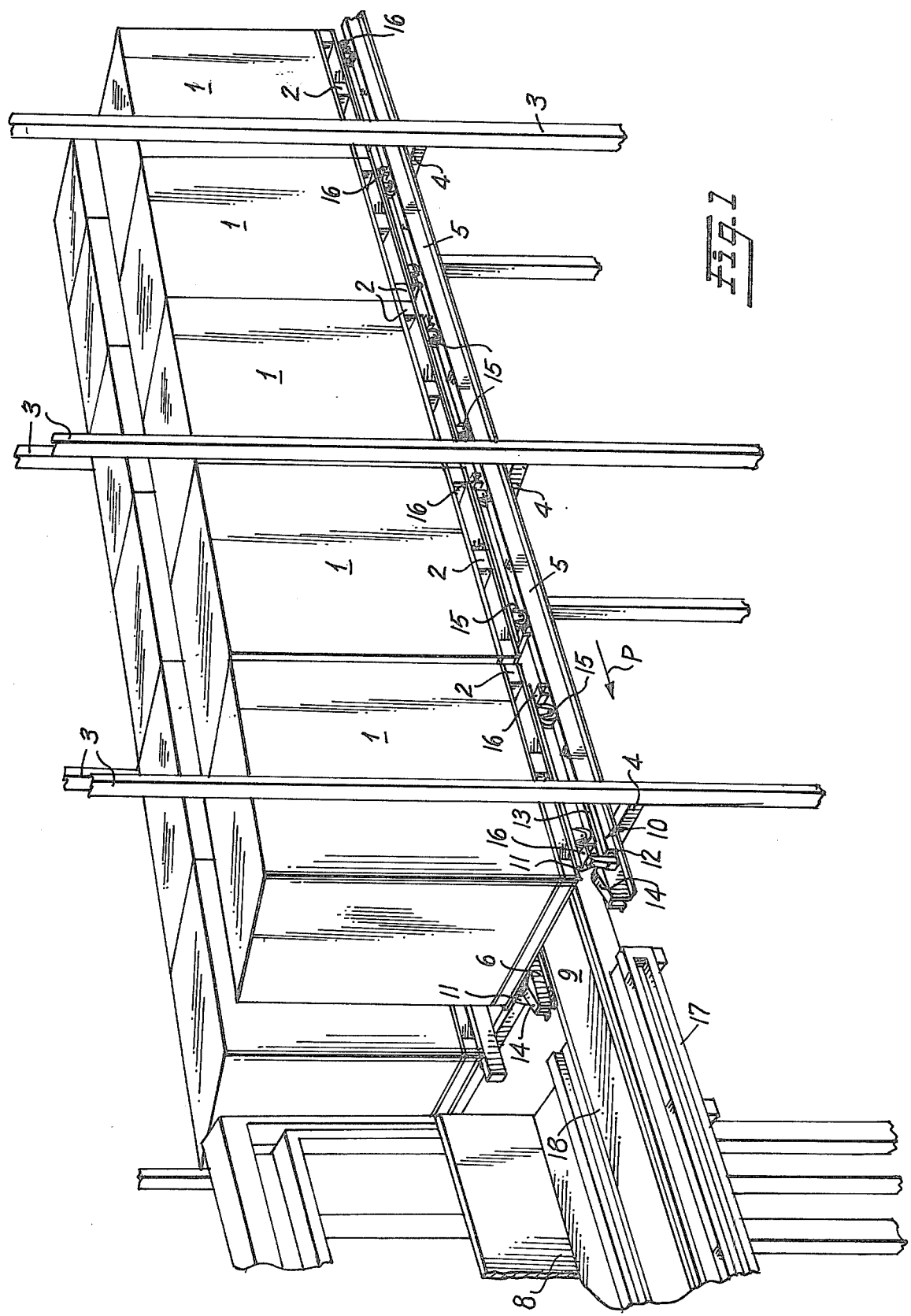
FIG. 1 shows a view of part of two storage shelves forming part of the storage system as well as a partial view of a transfer apparatus.

The basic structure of this storage system in already known in Buhler, U.S. Pat. No. 3,942,814 and Haldimann, U.S. Pat. No. 3,982,639. Only the parts which are of interest in connection with the present invention are therefore illustrated and described in greater detail below.

A rectangular stand can be seen in FIG. 1. This stand accomodates storage and transport units on pallets 2, loaded with goods 1. The stand comprises a number of vertical members 3 which are connected to each other through horizontally extending transverse members 4. Longitudinal trackway members 5 rest on the transverse members 4. The members 5 are preferably constructed as bars and have a slight falling gradient, relative to the horizontal plane, in the direction of arrow P, that is to say from a higher location at the top of FIG. 1 to a lower location at the bottom of the figure and in the direction of the receiving end of the shelf thus formed. A stop mechanism 10 is installed on the end of the bars 5, thus preventing the storage and transport units 2 from passing over the ends of the bars.

A mobile conveyer vehicle 8 (FIG. 1) is provided in a known manner on the front surface of the shelf. This vehicle 8 is equipped with a transfer mechanism 9 for loading and unloading of the shelves.

Referring now to FIG. 2 there can be seen a part of the trackway 5 in greater detail, i.e., the end part leading to the removal end of the shelf. There are two trackway members 5 and 6 in each shelf resting on horizontally arranged transverse members 4, the latter forming part of the shelf structure as shown in FIG. 1. In the region of the end of the trackways there are provided stop mechanisms, generally denoted by 10, fastened to the outer side of each trackway 5 and 6. The stop mechanism 10 comprises an upwardly projecting part 11 which reaches above the top of the trackway member. Said part 11 is fastened to a horizontally extending carrier member 12 running substantially parallel to the trackway members 5 and 6 respectively. The carrier member 12 is received in a sleeve 13 rigidly fastened to the trackway member, there being provided means to allow elastically dampened displacement of the carrier 12 in relation to sleeve 13 in order to dampen a hit caused by the transport unit pushing against the part 11 of the stop mechanism 10.

As can be clearly seen in FIG. 2 there is a certain distance between the ends of the trackway members 5 and 6 and the stop mechanism, the purpose thereof to be explained later. In the end region of the trackway members, i.e., between stop mechanism 10 and the ends of members 5 and 6 there are provided hump shaped elevations 14 on the top or running surfaces of the trackway members 5 and 6 the purpose of which also to be explained later.

Referring now to FIGS. 3 to 7 there are shown side views of part of the trackway at the removal end of a shelf as well as a take-over apparatus 9 situated in front of the shelf. On the trackway 5 there are a number of rolling storage units 23 loaded with goods 1. In the present example each of the units 23 comprises a load receiving platform 24 equipped with four wheels or rollers 15 arranged in the region of the four corners of the platform 24. At the front at 25 and at the rear 26 of the storage unit 23 there are provided transverse members 16 projecting downwardly and intended to cooperate with stop members 11. It can also be clearly seen that the axis of rotation of the rollers 15 is a certain amount behind the frontal face of the cross member 16 ensuring that the periphery of the rollers 15 is behind the members 16, the frontal face thereof being the foremost part of the storage unit 23. Of course, there is a corresponding situation at the rear of unit 23 thus ensuring that the loaded units 23 can be put onto the trackway in either direction.

The take-over apparatus comprises a schematically drawn frame structure 17 to receive the movable part 9 thereof which can be shifted towards the shelf and retracted from the shelf. For simplicity's sake, in the drawings there is shown only the most essential part of the part 9, i.e., an endless chain or belt 18.

As shown in FIG. 3 the transport vehicle just docked on the shelf and the movable part 9 with its belt 18 of the take-over apparatus has been shifted towards the shelf and is now between the trackway 5 below the front part of the foremost storage unit 23. The vehicle is now ready for removal from the shelf. The unit 23 pushes with its front cross member 16 against stop members 11. As can be seen in FIG. 4 the entire take-over apparatus has now been lifted somewhat and the endless belt has been switched on. As a consequence thereof the cross member 16 of unit 23 also is lifted and can pass over the stop member 11. The rear rollers 15 roll on the trackway 5 while the belt 18 is further actuated. The unit 23 is going to be pulled out from the shelf. We have now the situation as shown in FIG. 5. There can be clearly recognized that the rear cross member 16 is going to approach the stop members 11, preventing a further pulling out of the unit 23.

In order to overcome this, the hump shaped elevations 14 at the ends of the trackways 5 and 6 are provided. Just before the rear cross member 16 reaches the stop members 11 the rear rollers 15 have reached the elevations 14 and roll up thereon forcing the rear part 26 of unit 23, and therewith the rear cross member 16, to an upward movement. This situation is shown in FIG. 6. The rear rollers have arrived at the top of the elevations 14 and consequently the rear cross member 16 cannot touch the stop members 11. Now the unit 23 can be pulled out further and the rear cross member 16 is also going to rest on the endless belt 18.

The second storage unit begins to move forward due to the inclined trackways 5 and 6 until its front cross member 16 pushes against the stops 11. If it is desired to take-over this second unit also the take-over apparatus is lowered and lifted again to lift the front part of the second unit 23 and the belt 18 is further actuated. The entire proceeding as just described is repeated.

As soon as one or two of the units have been loaded onto the take-over apparatus of the transport vehicle the moveable part including belt 18 is retracted (FIG. 7) and the unit or units 23 can be transported away to any desired destination.

The elevation of the cam 14 raises the transport unit at least a little more above the rolling surface of trackways 5 and 6 than the effective height of the stop members 11. Moreover, the distance between stop member 11 and the top of the elevation of cam 14 is a little less than the distance between cross members 16 and the axis of rotation of the rollers 15 to avoid the cross members 16 touching the stop members 11.

An auxiliary chock mechanism is shown in FIGS. 2, 3, and 4 which prevents the follow-up transport unit from rolling backwards and consists of chock 30, which is wedge shaped, engaging the inner rim of the wheel and levers 32 connected to pivoted lever 33 by connecting arm 34. Only one chock mechanism is shown but there is one for each track member 5 and 6.

With construction as herein described, there is provided a very simple, reliable and inexpensive apparatus for taking over a loaded rolling storage unit from a shelf to a transport vehicle. No additional mobile parts are required, neither on the shelf nor on the take-over apparatus which would require additional attention or maintenance or involve additional high costs.

I claim:

1. In a shelf storage system comprising:

a rectangular stand formed of vertical members connected to each other by horizontally extending front and rear transverse members to form a shelf for storage;

a pair of longitudinal trackway members resting on the ends of said transverse members of said stand, the one end of said stand having track members at a higher elevation than at the other end of said stand to form a falling grade at the receiving end of the shelf of said stand;

a mobile storage and transport unit;

said mobile storage and transport unit load supporting a four sided frame supported on two pair of identical rotatable wheels disposed on an axle at opposite sides of said frame, said wheels having their front and rear axles supported in said frame and the axis of rotation of the wheels being below the load supporting surface of said frame;

means for removing a single storage and transport unit from said system;

the improvement comprising an unloading mechanism to remove a single unit to a fork lift vehicle, said unloading mechanism including a stop mechanism including a vertical stop means fastened to the outer side of each track member adjacent the end thereof to prevent the mobile storage and transport units from moving over the ends of said track; and a cam having a hump shape located on the top surface of said trackway between the ends of each of the trackways, the hump elevation of said cam raising the transport unit a little higher than the effective height of the stop members to facilitate level removal of the load, pallet and transport unit by raising the rear two wheels by the cam and pulling by the lifting conveyer of said fork lift vehicle.

* * * * *